(12) United States Patent
Balakrishnan et al.

(10) Patent No.: US 11,613,249 B2
(45) Date of Patent: Mar. 28, 2023

(54) AUTOMATIC NAVIGATION USING DEEP REINFORCEMENT LEARNING

(71) Applicant: Ford Global Technologies, LLC, Dearborn, MI (US)

(72) Inventors: Kaushik Balakrishnan, Mountain View, CA (US); Praveen Narayanan, San Jose, CA (US); Mohsen Lakehal-ayat, Mountain view, CA (US)

(73) Assignee: Ford Global Technologies, LLC, Dearborn, MI (US)

( * ) Notice: Subject to any disclaimer, the term of this patent is extended or adjusted under 35 U.S.C. 154(b) by 1395 days.

(21) Appl. No.: 15/944,563

(22) Filed: Apr. 3, 2018

(65) Prior Publication Data

US 2019/0299978 A1  Oct. 3, 2019

(51) Int. Cl.
*B60W 30/06* (2006.01)
*G05D 1/02* (2020.01)
*G05D 1/00* (2006.01)

(52) U.S. Cl.
CPC .......... *B60W 30/06* (2013.01); *G05D 1/0088* (2013.01); *G05D 1/0221* (2013.01)

(58) Field of Classification Search
CPC .......... B60W 30/06; B60W 2550/402; G05D 1/0088; G05D 1/0221; G06N 3/006; G06N 3/0454; G06N 3/08; B62D 15/0285; G01C 21/00
See application file for complete search history.

(56) References Cited

U.S. PATENT DOCUMENTS 10,545,510 B2 * 1/2020 Colijn .................... G08G 1/147
10,782,694 B2 * 9/2020 Zhang .................... G08G 1/167
2017/0329331 A1   11/2017 Gao
2018/0032863 A1 *  2/2018 Graepel ............... G06N 3/0454
2020/0151562 A1 *  5/2020 Pietquin ............... G06N 3/0472

FOREIGN PATENT DOCUMENTS

CN   105109482 A   2/2015
CN   105527963 A   7/2016
CN   107065567 A   8/2017

OTHER PUBLICATIONS

English Translation of CN-105527963-A.*
A Vision-Guided Parallel Parking System for a Mobile Robot using Approximate Policy Iteration.
GitHub—taochenshh/Automatic-Parking: Automatic parking with Reinforcement Learning.
Smart Parking According to AUDI.

* cited by examiner

*Primary Examiner* — Rami Khatib
*Assistant Examiner* — Shahira Baajour
(74) *Attorney, Agent, or Firm* — David R. Stevens; Stevens Law Group (57) ABSTRACT

A method for training an autonomous vehicle to reach a target location. The method includes detecting the state of an autonomous vehicle in a simulated environment, and using a neural network to navigate the vehicle from an initial location to a target destination. During the training phase, a second neural network may reward the first neural network for a desired action taken by the autonomous vehicle, and may penalize the first neural network for an undesired action taken by the autonomous vehicle. A corresponding system and computer program product are also disclosed and claimed herein.

18 Claims, 7 Drawing Sheets

AUTOMATIC NAVIGATION USING DEEP REINFORCEMENT LEARNING

BACKGROUND

Field of the Invention

This invention relates to navigation for vehicles.

Background of the Invention

Parking a vehicle, especially parallel parking, is a skill that requires much practice and trial-and-error experience. Even experienced drivers tend to avoid this task since proper maneuvering depends not only on the skill of the driver, but also on largely unpredictable environmental factors, such as the slope and area of the available parking spot and the orientation and movement of adjacent vehicles. In addition, the high costs associated with even small mistakes often deter all but the most confident drivers.

Automatic parking technology has been developed to autonomously move a vehicle into a desired parking spot from an initial starting location, such as a traffic lane. To this end, modern automatic parking systems engage in a step-by-step process where steering angle, brake and accelerator values are calculated in situ by an onboard vehicle network. Coordinated control of the steering angle and speed, taking into account the current pose of the vehicle and surrounding environment, virtually ensures collision-free orientation of the vehicle in an available parking space.

Though still under development, automatic parking capability is also an integral component of autonomous vehicles. Such vehicles may be required to perform parallel parking maneuvers under the same wide range of initial conditions and/or operational parameters as human drivers. In addition, autonomous vehicles may be required to drive under special scenarios, such as accident zones or construction zones, that are not included as part of a pre-determined map. Successful navigation is critical in any case, as high costs may result from small mistakes.

In view of the foregoing, what are needed are systems and methods to train an autonomous vehicle to automatically reach a desired target location. Ideally, such systems and methods would train an autonomous vehicle to efficiently and accurately respond to a wide range of initial locations, orientations, and operating parameters of the vehicle relative to a final target destination location. Such systems and methods would also be scalable, robust, and utilize trial-and-error training to enable a network to learn from its mistakes.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

Figure 1:
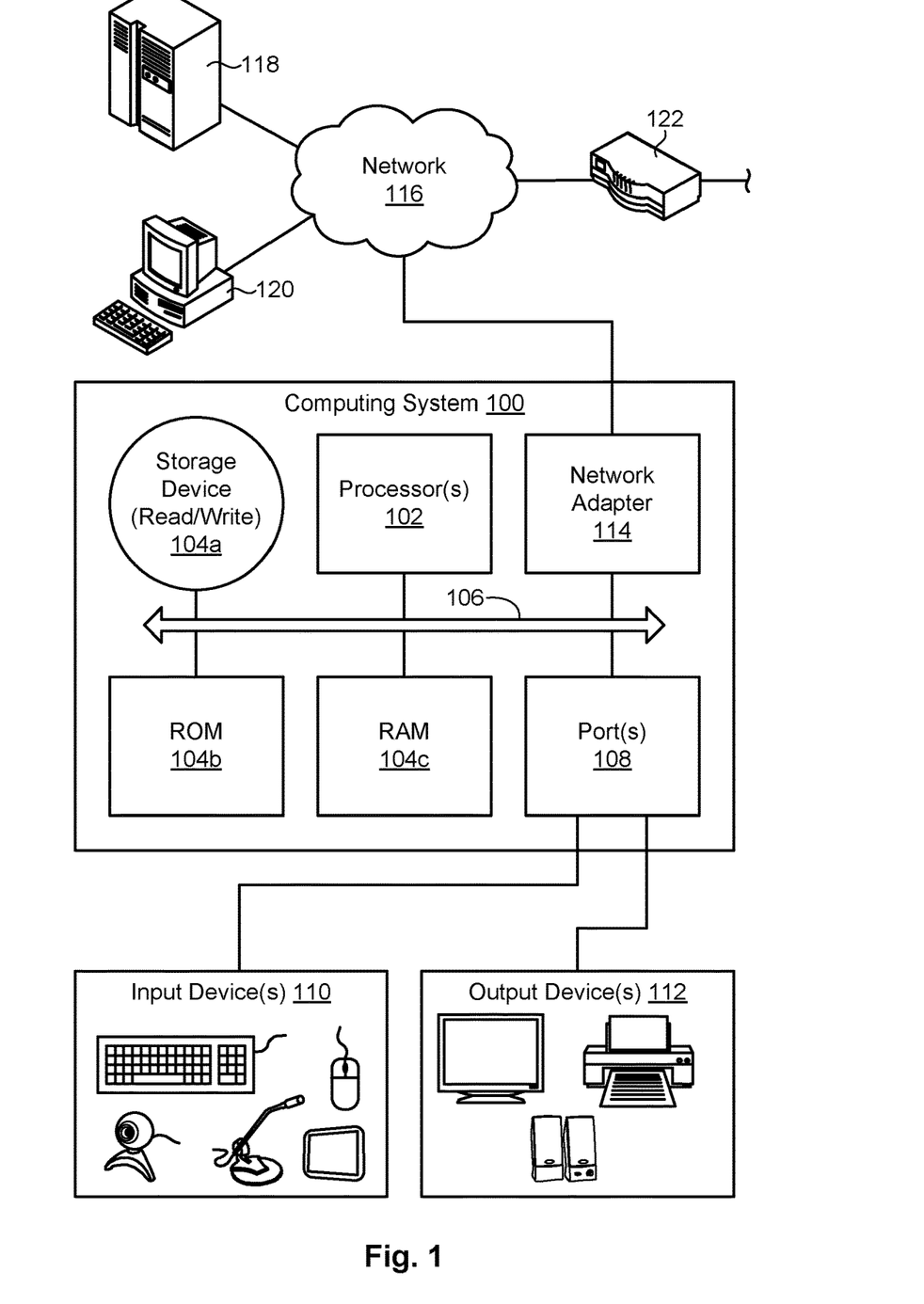
FIG. 1 is a high-level block diagram showing one example of a computing system in which a system and method in accordance with the invention may be implemented.

Referring to FIG. 1, one example of a computing system 100 is illustrated. The computing system 100 is presented to show one example of an environment where a system and method in accordance with the invention may be implemented. The computing system 100 may be embodied as a mobile device 100 such as a smart phone or tablet, a desktop computer, a workstation, a server, or the like. The computing system 100 is presented by way of example and is not intended to be limiting. Indeed, the systems and methods disclosed herein may be applicable to a wide variety of different computing systems in addition to the computing system 100 shown. The systems and methods disclosed herein may also potentially be distributed across multiple computing systems 100.

As shown, the computing system 100 includes at least one processor 102 and may include more than one processor 102. The processor 102 may be operably connected to a memory 104. The memory 104 may include one or more non-volatile storage devices such as hard drives 104a, solid state drives 104a, CD-ROM drives 104a, DVD-ROM drives 104a, tape drives 104a, or the like. The memory 104 may also include non-volatile memory such as a read-only memory 104b (e.g., ROM, EPROM, EEPROM, and/or Flash ROM) or volatile memory such as a random access memory 104c (RAM or operational memory). A bus 106, or plurality of buses 106, may interconnect the processor 102, memory devices 104, and other devices to enable data and/or instructions to pass therebetween.

To enable communication with external systems or devices, the computing system 100 may include one or more ports 108. Such ports 108 may be embodied as wired ports 108 (e.g., USB ports, serial ports, Firewire ports, SCSI ports, parallel ports, etc.) or wireless ports 108 (e.g., Bluetooth, IrDA, etc.). The ports 108 may enable communication with one or more input devices 110 (e.g., keyboards, mice, touchscreens, cameras, microphones, scanners, storage devices, etc.) and output devices 112 (e.g., displays, monitors, speakers, printers, storage devices, etc.). The ports 108 may also enable communication with other computing systems 100.

In certain embodiments, the computing system 100 includes a wired or wireless network adapter 114 to connect the computing system 100 to a network 116, such as a LAN, WAN, or the Internet. Such a network 116 may enable the computing system 100 to connect to one or more servers 118, workstations 120, personal computers 120, mobile computing devices, or other devices. The network 116 may also enable the computing system 100 to connect to another network by way of a router 122 or other device 122. Such a router 122 may allow the computing system 100 to communicate with servers, workstations, personal computers, or other devices located on different networks.

As previously mentioned, autonomous vehicle technology is currently under development with the goal of providing a fully-autonomous vehicle capable of performing the same functions and maneuvers as a human operator, with even greater precision and efficiency. Automatic parking and navigation under a variety of circumstances is critical to autonomous vehicle functionality. Embodiments of the invention address this issue by training autonomous vehicles in a simulated environment to efficiently and accurately respond to a range of initial locations, orientations, and operating parameters of the vehicle relative to a final target destination location.

As discussed in detail below, a system for automatically navigating an autonomous vehicle using deep reinforcement learning in accordance with the invention may guide an autonomous vehicle from an initial location to a desired target location in a step-by-step process. In certain embodiments, steering angle, brake and accelerator values may be calculated in situ by an onboard neural network. The network may receive the current location and orientation of the vehicle as input from an array of sensors. Two unique deep reinforcement learning frameworks—a deep Q-network and an asynchronous advantage ("A3N") actor-critic network—may be implemented to train the onboard network. Output from these frameworks may be fed into the control system of the autonomous vehicle in real time to execute the maneuver.

Figure 2:
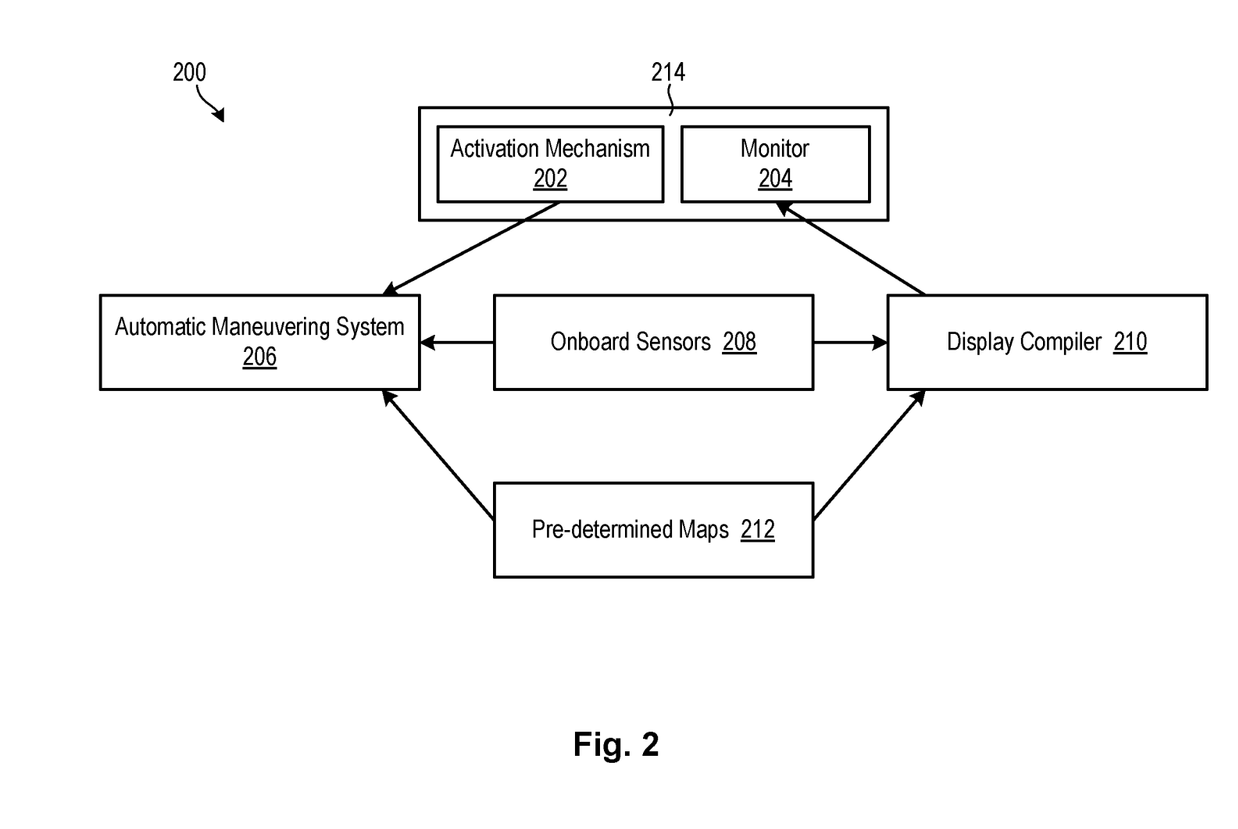
FIG. 2 is a high-level block diagram showing components of a system for training an autonomous vehicle to reach a target destination in accordance with certain embodiments of the invention.

Referring now to FIG. 2, a system 200 for automatic navigation using deep reinforcement learning in accordance with the invention may include an autonomous vehicle having an array of sensors 208 and an automatic maneuvering system 206. These subsystems may interface with a neural network onboard the autonomous vehicle to train the neural network to reach a target destination accurately and efficiently.

Sensors 208 may include, for example, camera sensors, lidar sensors, radar sensors, location or GPS sensors, ultrasound sensors, and the like. Information gathered from the various sensors 208 may be processed by the onboard neural network and received by the automatic maneuvering system 206. In this manner, the sensors 208 may inform and update the automatic maneuvering system 206 substantially continuously regarding a current state of the autonomous vehicle, including its location, orientation, and status.

In addition, the sensors 208 may provide to a display compiler 210 information regarding a current state of the autonomous vehicle. Such information may be communicated to the display compiler 210 periodically or substantially continuously via the onboard network. The display compiler 210 may use this information, in combination with information from pre-determined maps 212 (such as those provided by GPS data) of the surrounding area, to make real-time calculations and produce graphical representations relevant to navigation of the autonomous vehicle. This compiled data may be communicated to a dashboard 214 for display to a user, as discussed in more detail below.

In certain embodiments, a dashboard 214 or other user interface may be visible to a user to enable activation and control of the system 200. In some embodiments, the dashboard 214 may be displayed on a remotely-located computer, mobile phone, smart device, or the like, and may maintain connectivity with the neural network by way of an appropriate wireless communication technology, such as a Wi-Fi connection, cellular data connection, the internet, or other communication technology known to those in the art.

The dashboard 214 may enable a user to activate the system via an activation mechanism 202. The dashboard 214 may also include a monitor 204 or other display device to enable a user to monitor the state of the autonomous vehicle and/or its surrounding environment. In certain embodiments, the activation mechanism 202 may include a physical button, a virtual button on a screen, a voice command, a mouse click, a finger touch, or the like. In some embodiments, the monitor 204 may provide a real-time initial location of the autonomous vehicle, and the activation mechanism 202 may operate in combination with the monitor 204 to enable the user to activate the automatic maneuvering system 206 by selecting a final destination on the monitor 204.

Figure 3:
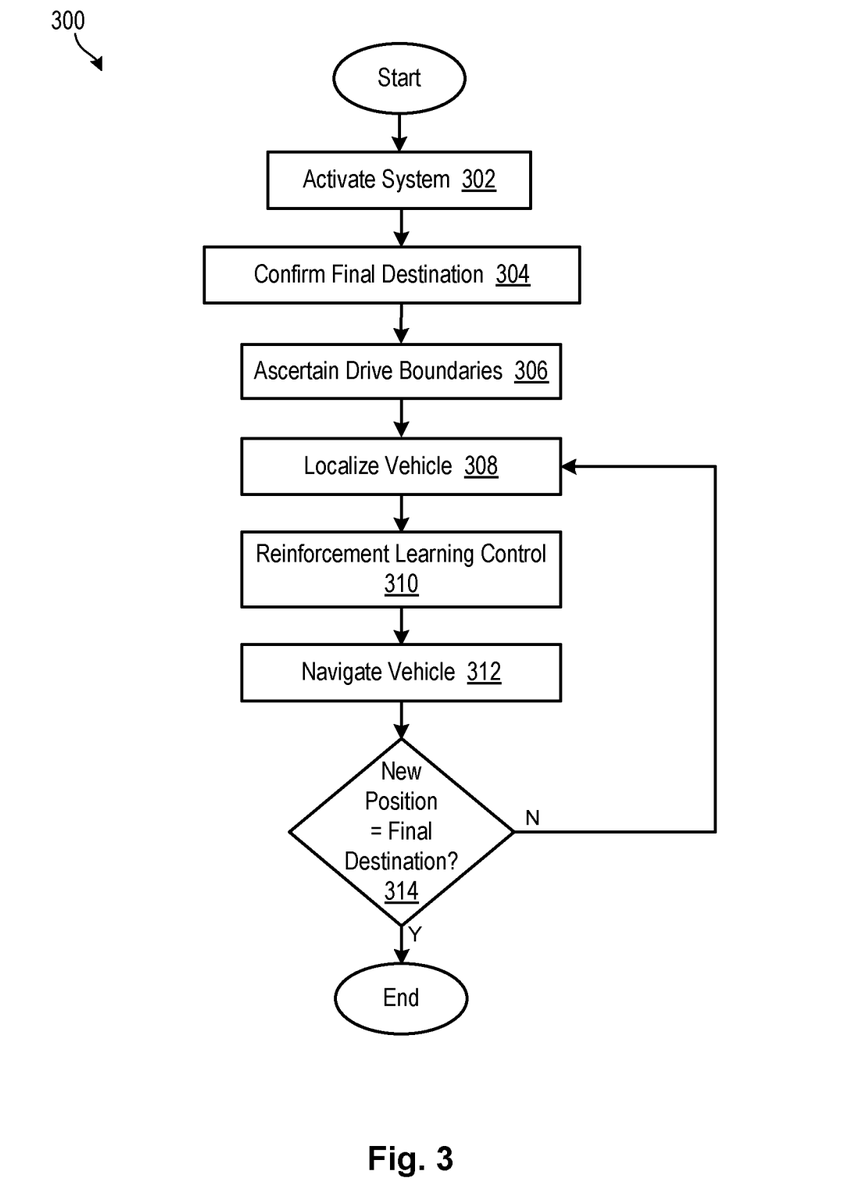
FIG. 3 is a flow chart showing a process for automatic maneuvering in accordance with embodiments of the invention.

Referring now to FIG. 3, embodiments of the present invention may incorporate an automatic maneuvering system 206 which is scalable, efficient, robust, and can account for a wide range of initial locations and/or orientations of the autonomous vehicle relative to its final or target destination. The automatic maneuvering system 206 may include a deep reinforcement learning framework, and may be implemented in a simulated environment where numerous trials and errors may be used to train the onboard neural network. In certain embodiments, the automatic maneuvering system 206 may train the onboard neural network to learn from mistakes using an exploration-exploitation tradeoff.

To this end, embodiments of an automatic maneuvering system 206 in accordance with the invention may perform certain method 300 steps. For example, the automatic maneuvering system 206 may be activated 302 by a user via an activation mechanism 202 such as a physical button, a virtual button on a screen, a voice command, a mouse click, a finger touch on a screen, or the like. In some embodiments, the activation mechanism 202 may be visible and accessible to a user via a physical or virtual dashboard 214 of a remote device. In other embodiments, the activation mechanism 202 may be located onboard the autonomous vehicle. In certain embodiments, the activation mechanism 202 may allow a user to select a target destination for the autonomous vehicle, or the user may select the target destination via a monitor 204 or other mechanism or device known to those in the art.

The automatic maneuvering system 206 may confirm 304 the selected destination as the final destination for the autonomous vehicle by determining location and/or directional coordinates corresponding to the selected destination. Location coordinates may be determined by referencing data gathered by onboard sensors 208, including GPS sensors, and/or predetermined maps 212. Directional coordinates may include, for example, a final heading angle or steering angle for the autonomous vehicle. In one embodiment, a final destination or target position may be expressed as $(x, y, h)_F$, where x and y are locations on perpendicular lateral axes, and h is a final heading angle.

In some embodiments, the automatic maneuvering system 206 may ascertain 306 drive boundaries within a surrounding area to facilitate navigating the autonomous vehicle from an initial location to a final target destination without interference from objects or obstacles in the vicinity. Drive boundaries may include, for example, stationary objects or obstacles such as road signs, trees, buildings, bodies of water, and the like. Drive boundaries may be determined by referencing sensor 208 data and/or pre-determined maps 212.

Upon determining a safe drive area based on the drive boundaries, the autonomous vehicle may be localized 308 using sensor 208 data and pre-determined maps 212. Localizing 308 the autonomous vehicle may include determining an orientation of the vehicle, a location of the vehicle, a control status, a steering angle, and the like. This information, in addition to the final destination coordinates and drive boundaries, may be received 310 by the onboard neural network via onboard sensors 208.

In certain embodiments, the reinforcement learning control framework may include a deep Q-network that learns from mistakes using an exploration-exploitation tradeoff. As discussed in more detail below, the deep Q-network may utilize numerous trials and errors where it is rewarded for good actions and penalized for bad actions. In one embodiment, an epsilon-greedy strategy may be used for exploration versus exploitation decisions during the training of the neural networks.

The information received 310 by the onboard neural network may be processed and utilized to navigate 312 the vehicle from its initial location to its final location. In some embodiments, based on this information, the neural network may determine appropriate incremental adjustments to a vehicle steering angle, acceleration, and/or brake to enable the autonomous vehicle to reach the final target destination.

For example, in one embodiment, the system may be initially activated 302 at time $t_t$. The onboard neural network may receive 310 sensor information for the autonomous vehicle that corresponds to $t_t$, and the reinforcement learning control framework may be utilized to process such information. Based on that information, appropriate vehicle controls or settings may be determined and used to navigate 312 the autonomous vehicle to a new position at time $t_{t+1}$.

Location and directional coordinates corresponding to the new position may be compared 314 with the final destination. If the new position coordinates match the final destination coordinates, the method 300 may end. If not, the method 300 may return to localize 308 the vehicle and iterate the process 300 until the autonomous vehicle reaches the final destination.

Figure 4:
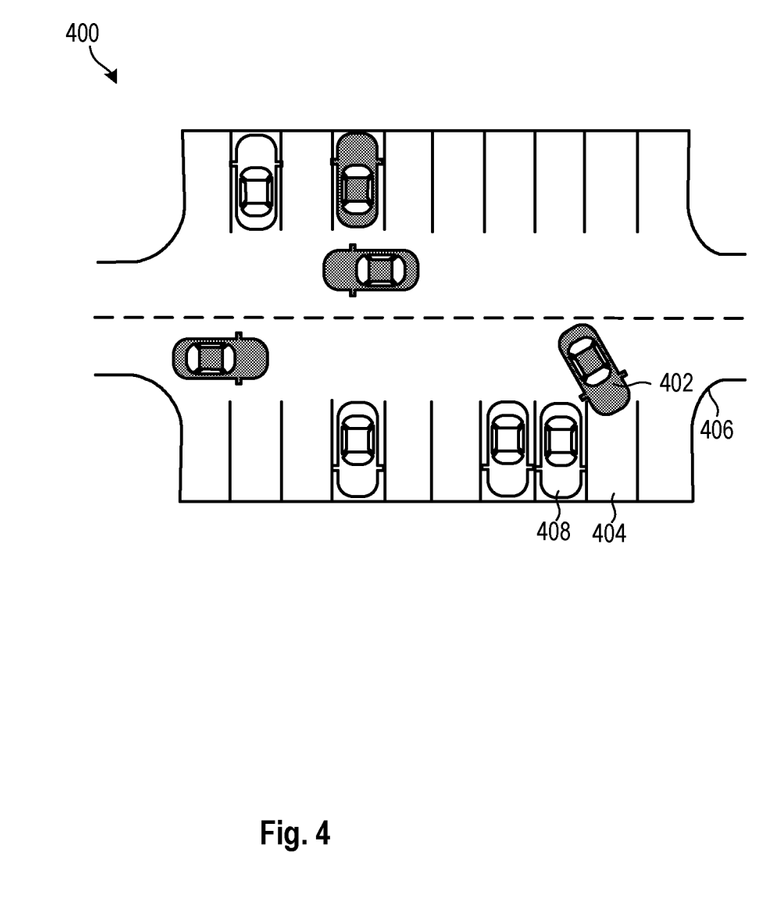
FIG. 4 is a high-level schematic diagram showing training an autonomous vehicle to perform perpendicular parking in accordance with certain embodiments of the invention.

Referring now to FIG. 4, certain embodiments of the invention may provide a simulated environment 400 having perpendicular parking spaces 404. As discussed above, in some embodiments, a deep Q-network may be used to train an autonomous vehicle 402 to automatically occupy an available perpendicular parking space 404.

The autonomous vehicle 402 may include an array of onboard sensors to gather data from the external environment. The array of sensors may include, for example, image camera sensors, depth camera sensors, infrared camera sensors, lidar sensors, radar sensors, ultrasound sensors, and the like. This data may be input into the automatic maneuvering system 206 and used in combination with predetermined map data to train the autonomous vehicle 402 to properly and efficiently maneuver into the perpendicular parking space 404.

In some embodiments, a user may activate the system and select a perpendicular parking space 404 as the target destination. Using data from the array of onboard sensors as well as predetermined map information, the automatic maneuvering system 206 may determine location and/or directional coordinates corresponding to the perpendicular parking space 404. The automatic maneuvering system 206 may determine a safe driving area by identifying and locating drive boundaries in the surrounding area. As shown, for example, drive boundaries may include a curb 406 and other vehicles 408 parked in adjacent parking spaces.

Onboard sensors may further gather information regarding a current state of the autonomous vehicle 402, including its location and orientation. The automatic maneuvering system 206 may input this information into the reinforcement learning framework of the onboard neural network for processing. Based on this information, the reinforcement learning framework may output appropriate vehicle control indications or settings to the autonomous vehicle 402, such as steering angle, acceleration, and brake.

In one embodiment, for example, the reinforcement learning framework may determine that the autonomous vehicle 402 should adjust its steering angle by 15 degrees and decelerate by 2 mph within a one second period of time. These indications may be input into the vehicle control system, resulting in a vehicle action. Upon expiration of the one second period of time, a new position of the autonomous vehicle 402 may be determined. This process may be repeated until the new position of the autonomous vehicle 402 matches the coordinates for the perpendicular parking space 404 such that the autonomous vehicle 402 is properly positioned within the perpendicular parking space 404.

In embodiments utilizing a deep Q-network during the training phase, the reinforcement learning framework may include an actor network and a critic network. The first neural network, or actor network, may determine appropriate vehicle control indications or settings for implementation by the vehicle control system, while a second neural network, or critic network, may monitor actions taken by the autonomous vehicle 402 in accordance with those indications.

The second neural network, or critic network, may analyze each action taken by the autonomous vehicle 402 to determine whether it was beneficial or detrimental to accurately and efficiently maneuvering the autonomous vehicle 402 into the perpendicular parking space 404 or other final target destination. If the action taken was desired, or beneficial, the second neural network may reward the first neural network by generating a certain signal. If the action taken was not desired, or detrimental, to effectively navigating the autonomous vehicle 402 to the target destination, the second neural network my penalize the first neural network via a temporal difference error signal. In this manner, the critic network trains the actor network to perform beneficial actions and to "learn" from its mistakes during the training phase.

In certain embodiments, a replay buffer may store past vehicle states, actions taken at each state, and the corresponding rewards and penalties applied. For training, a small batch of data may be sampled from the replay buffer and used to train each neural network. When the replay buffer is full, the old data may be discarded and replaced by new data obtained from more recent performance episodes.

Figure 5:
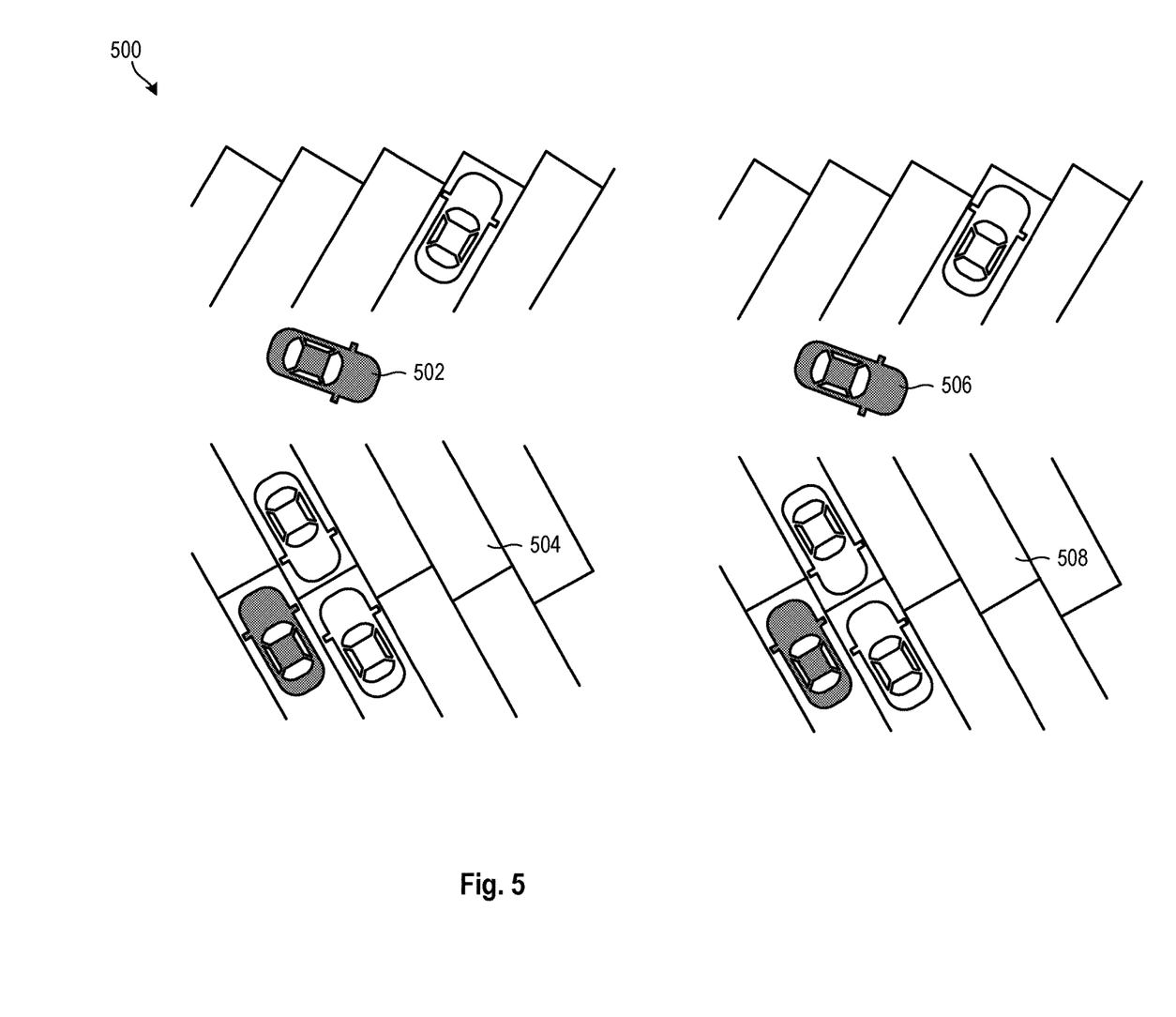
FIG. 5 is a high-level schematic diagram showing training an autonomous vehicle to perform angled parking in accordance with certain embodiments of the invention.

Referring now to FIG. 5, another embodiment of the invention may provide a simulated environment 500 having angled parking spaces 504. In this embodiment, an actor-critic formulation such as A3C may be used. Specifically, multiple autonomous vehicles 502, 506 may navigate to a corresponding angled parking space 504, 508 substantially simultaneously. Their resulting performances may be cumulated by a central master actor and used to train their respective neural networks.

As shown, for example, a first autonomous vehicle 502 may be located and oriented in a particular position relative to a first angled parking space 504. A second autonomous vehicle 506 may be located and oriented in the same position relative to a second angled parking space 508. In each case, the final target destination for each of the first and second autonomous vehicles 502, 504 may be the first and second angled parking spaces 504, 508, respectively.

An automatic maneuvering system 206 of each autonomous vehicle 502, 506 may be activated by a user to automatically maneuver each of the autonomous vehicles 502, 506 from their initial positions to their respective angled parking spaces 504, 508. Each automatic maneuvering system 206 may operate independently to explore the state-action space and thereby determine a good policy for navigation. As above, an array of onboard sensors associated with each vehicle 502, 506 may gather information substantially continuously regarding the current state of its respective autonomous vehicle 502, 506. This information may be communicated to onboard neural networks associated with each autonomous vehicle 502, 506 for processing.

A designated network corresponding to one of the autonomous vehicles 502 for example, or central master actor, may update the neural networks of both autonomous vehicles 502, 506 based on information received from each autonomous vehicle 502, 506 upon exploring the same environment 500. Resulting weights or scores after rewards and penalties have been applied by each neural network may be shared across the different autonomous vehicle 502, 506 networks. Training multiple autonomous vehicles 502, 506 in this manner may result in faster learning, since multiple autonomous vehicles 502, 506 execute the same task in parallel across multiple threads of a network.

Figure 6:
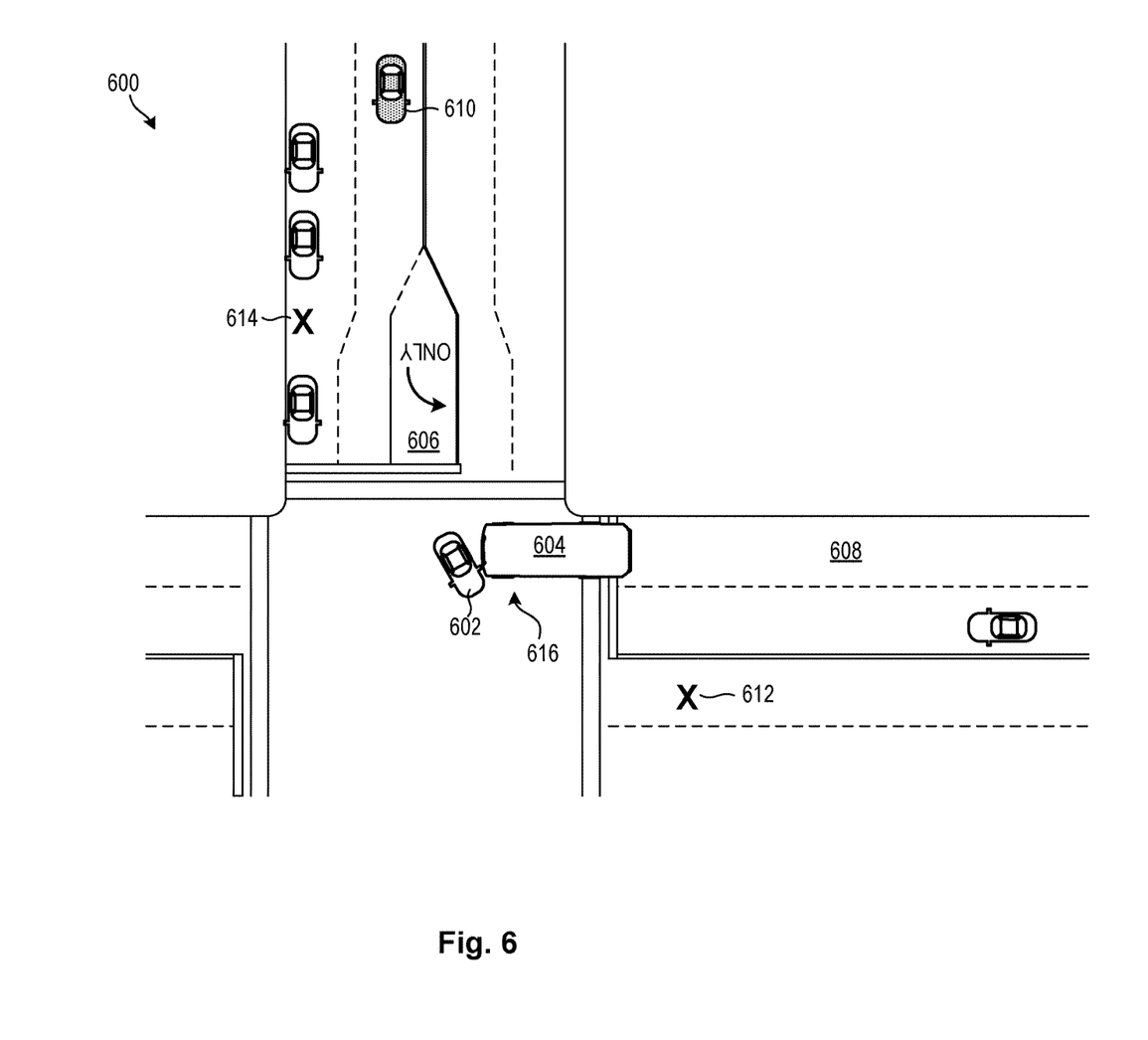
FIG. 6 is a high-level schematic diagram showing a simulated environment providing a parallel parking space and an accident zone in accordance with certain embodiments of the invention.

Referring now to FIG. 6, certain embodiments may incorporate a dual-framework system, where both a deep Q-network and an A3C actor-critic formulation may be used to train an autonomous vehicle 610 to reach a target destination in accordance with the invention.

One embodiment of the invention may train an autonomous vehicle 610 to perform various tasks (i.e., parking, navigating accident or construction zones, or the like) utilizing both the deep Q-network framework and the A3C framework. The performance of each framework may then be analyzed to determine which framework performs better in which regions of the phase space.

For example, in one embodiment, the deep Q-network framework may demonstrate better performance at the autonomous vehicle's initial location, while the A3C framework may demonstrate better performance at or near its final destination. This information may be stored in a look-up table that identifies various locations or regions where each of the frameworks is superior to the other in performance. The look-up table may be stored locally onboard the autonomous vehicle 610. Alternatively, the look-up table may be stored remotely on a server or database, and communicated to the autonomous vehicle 610 via V2V communication, WiFi, the internet, or other communication method known to those in the art. In any case, activation of the automatic navigation system in accordance with embodiments of the invention may also trigger activation of the better-performing framework, depending on the state of the vehicle 610 and the task to be performed.

As shown, one embodiment of a simulated environment 600 in accordance with the invention may include an autonomous vehicle 610 having an available parallel parking space 614 as its target destination. Embodiments of the invention may access a look-up table to determine that the deep Q-network is superior to the A3C framework at an initial vehicle 610 location, while the A3C framework is superior to the deep Q-network until the autonomous vehicle 610 nears the parallel parking space 614. Accordingly, the deep Q-network may be automatically triggered in response to sensor data indicating that the autonomous vehicle 610 is situated in its initial position, while the A3C framework may be automatically triggered in response to changed sensor data indicating that the autonomous vehicle 610 has moved to a position nearer to the parallel parking space 614.

In another embodiment, an autonomous vehicle 610 may have a target destination 612 that requires the autonomous vehicle 610 to make a left-hand turn 606 through an intersection. A direct path from the initial location of the autonomous vehicle 610 to the target destination 612 may be obstructed, however, due to a collision 616 between a preceding vehicle 602 attempting to make the same left-hand turn, and a bus 604 traveling in the opposite direction.

Training the autonomous vehicle 610 to avoid the collision 616 in transit to its target destination 612 in accordance with embodiments of the invention may also utilize a dual framework to determine in which regions of the phase space each performs better. In some embodiments, a score may be calculated for each region of the phase space, and may be associated with the corresponding framework. A discussed above, a score may be calculated according to the rewards and penalties received for corresponding actions. The framework with the highest score for a particular region of the phase space may be identified as the better performer for that region. This information may then recorded in a look-up table, as discussed above, and the appropriate framework may be triggered based on the region in which the autonomous vehicle 610 is located.

Figure 7:
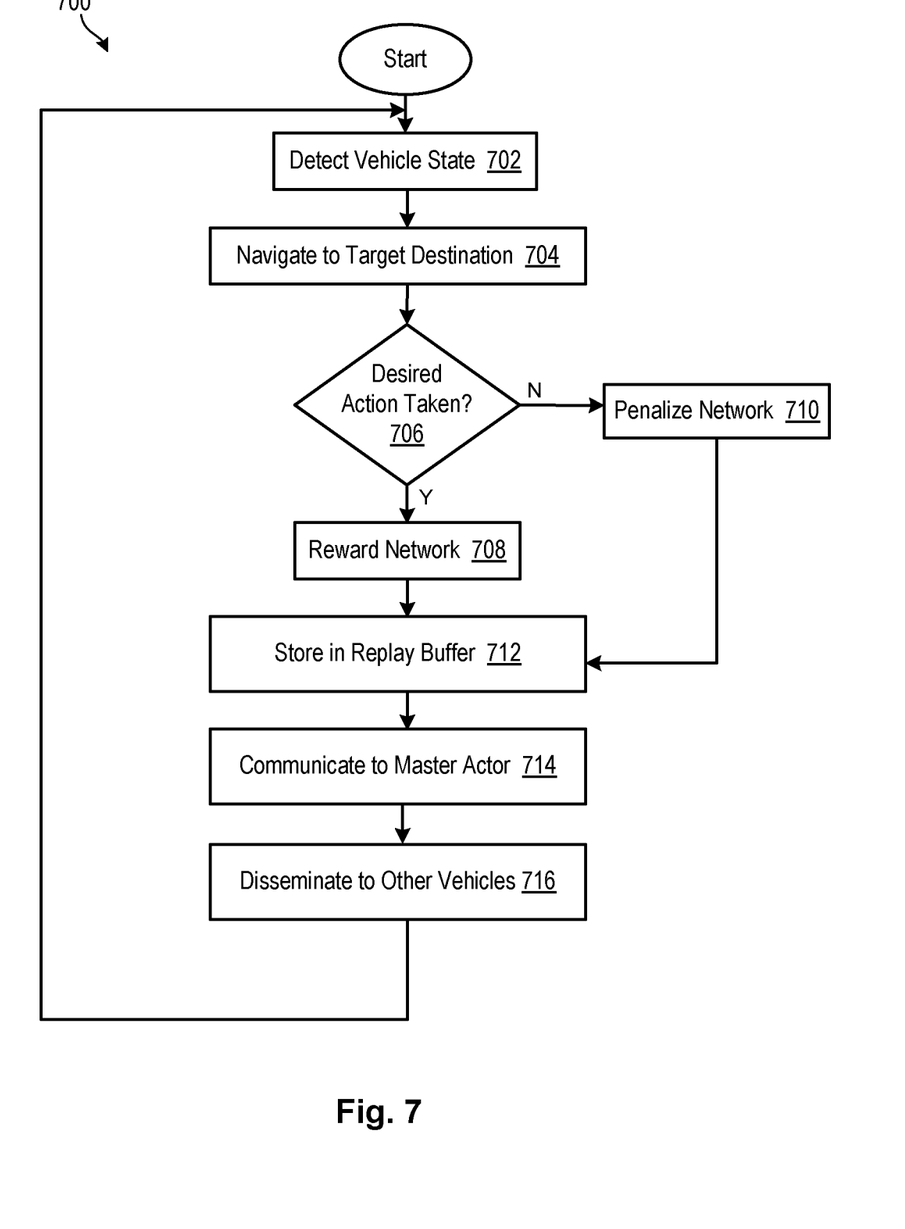
FIG. 7 is a flow chart showing a process for automatic vehicle navigation using deep reinforcement learning in accordance with certain embodiments of the invention.

Referring now to FIG. 7, a process 700 for automatic vehicle navigation using deep reinforcement learning in accordance with embodiments of the invention may include detecting 702 a vehicle state. A vehicle state may include, for example, its location, orientation, steering angle, control status, and the like. The vehicle state may be determined by referencing sensor data, as well as referencing data from external sources such as predetermined maps of a surrounding area.

The vehicle may then begin navigation 704 to a target destination. The target destination may be selected by a user, and location coordinates corresponding to the target destination may be input into the automatic maneuvering system. The automatic maneuvering system may process this information to enable the vehicle to take successive actions to reach the target destination. For each action taken, the process 700 may query 706 whether the action was desirable. If yes, the system may generate a signal to reward 708 the network for the action. If not, the system may generate a signal to penalize 710 the network for the action.

In either case, the reward or penalty received may be associated with the action taken and stored 12 in a replay buffer. Data from the replay buffer may be sampled and used to train networks. In certain embodiments, the data may also be communicated 714 to a central master actor, such as a network or processor associated with a designated autonomous vehicle. The central master actor may process the information and cumulate it with information obtained from networks associated with other autonomous vehicles performing the same task under the same circumstances. The cumulated information may then be disseminated 716 back to the networks associated with those autonomous vehicles to facilitate faster learning.

In the above disclosure, reference has been made to the accompanying drawings, which form a part hereof, and in which is shown by way of illustration specific implementations in which the disclosure may be practiced. It is understood that other implementations may be utilized and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Implementations of the systems, devices, and methods disclosed herein may comprise or utilize a special purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, implementations of the disclosure can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links, which can be used to carry desired program code means in the form of computer-executable instructions or data structures and which can be accessed by a general purpose or special purpose computer. Combinations of the above should also be included within the scope of computer-readable media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, an in-dash vehicle computer, personal computers, desktop computers, laptop computers, message processors, handheld devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Further, where appropriate, functions described herein can be performed in one or more of: hardware, software, firmware, digital components, or analog components. For example, one or more application specific integrated circuits (ASICs) can be programmed to carry out one or more of the systems and procedures described herein. Certain terms are used throughout the description and claims to refer to particular system components. As one skilled in the art will appreciate, components may be referred to by different names. This document does not intend to distinguish between components that differ in name, but not function.

It should be noted that the sensor embodiments discussed above may comprise computer hardware, software, firmware, or any combination thereof to perform at least a portion of their functions. For example, a sensor may include computer code configured to be executed in one or more processors, and may include hardware logic/electrical circuitry controlled by the computer code. These example devices are provided herein purposes of illustration, and are not intended to be limiting. Embodiments of the present disclosure may be implemented in further types of devices, as would be known to persons skilled in the relevant art(s).

At least some embodiments of the disclosure have been directed to computer program products comprising such logic (e.g., in the form of software) stored on any computer useable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the disclosure. Thus, the breadth and scope of the present disclosure should not be limited by any of the above-described exemplary embodiments, but should be defined only in accordance with the following claims and their equivalents. The foregoing description has been presented for the purposes of illustration and description. It is not intended to be exhaustive or to limit the disclosure to the precise form disclosed. Many modifications and variations are possible in light of the above teaching. Further, it should be noted that any or all of the aforementioned alternate implementations may be used in any combination desired to form additional hybrid implementations of the disclosure.

The invention claimed is:

1. A method comprising:
   identifying a state of an autonomous vehicle within a simulated environment, wherein the simulated environment comprises a plurality of operating parameters for training a reinforcement learning framework to calculate driving maneuvers for the autonomous vehicle;
   calculating, with an actor neural network, a driving maneuver for navigating the autonomous vehicle from an initial location to a target destination;
   determining, with a critic neural network, whether the driving maneuver was beneficial for accurately maneuvering the autonomous vehicle to the target destination;
   in response to determining the driving maneuver was beneficial, causing the critic neural network to reward the actor neural network during a training phase for the reinforcement learning framework; and
   in response to determining the driving maneuver was not beneficial, causing the critic neural network to penalize the actor neural network during the training phase for the reinforcement learning framework;
   wherein the critic neural network rewards the actor neural network by providing an error signal calculated with an exploration-exploitation tradeoff model.

2. The method of claim 1, wherein each of the actor neural network and the critic neural network are installed onboard the autonomous vehicle during the training phase for the reinforcement learning framework.

3. The method of claim 1, wherein the autonomous vehicle comprises at least one sensor selected from a group consisting of a camera sensor, a lidar sensor, a radar sensor, a GPS sensor, and an ultrasound sensor.

4. The method of claim 1, further comprising determining a state of the autonomous vehicle within the simulated environment, wherein the state comprises one or more of a location or an orientation of the autonomous vehicle.

5. The method of claim 1, wherein the critic neural network penalizes the actor neural network by providing an error signal calculated with an exploration-exploitation tradeoff model.

6. The method of claim 1, further comprising storing one or more of a state of the autonomous vehicle, an action taken at the state of the autonomous vehicle, or a reward and a penalty corresponding to the action in a replay buffer.

7. The method of claim 6, further comprising sampling the replay buffer to train the actor neural network.

8. The method of claim 7, further comprising iteratively navigating the autonomous vehicle from the initial location to the target destination in accordance with the training.

9. The method of claim 1, wherein calculating the driving maneuver further comprises:
   calculating a plurality of driving maneuvers for a plurality of autonomous vehicles from the initial location to the target destination, wherein the plurality of autonomous vehicles comprises the autonomous vehicle; and
   communicating information from a neural network corresponding to each of the plurality of autonomous vehicles to a central master actor.

10. A system comprising:
    an autonomous vehicle comprising a sensor;
    one or more processors configurable to execute instructions stored in non-transitory computer readable memory, the instructions comprising:
    identifying a state of an autonomous vehicle within a simulated environment, wherein the simulated environment comprises a plurality of operating parameters for training a reinforcement learning framework to calculate driving maneuvers for the autonomous vehicle;
    calculating, with an actor neural network, a driving maneuver for navigating the autonomous vehicle from an initial location to a target destination;
    determining, with a critic neural network, whether the driving maneuver was beneficial for accurately maneuvering the autonomous vehicle to the target destination;
    in response to determining the driving maneuver was beneficial, causing the critic neural network to reward the actor neural network during a training phase for the reinforcement learning framework; and
    in response to determining the driving maneuver was not beneficial, causing the critic neural network to penalize the actor neural network during the training phase for the reinforcement learning framework;
    wherein the critic neural network rewards the actor neural network by providing an error signal calculated with an exploration-exploitation tradeoff model.

11. The system of claim 10, wherein each of the actor neural network and the critic neural network are installed onboard the autonomous vehicle during the training phase for the reinforcement learning framework.

12. The system of claim 10, wherein the sensor of the autonomous vehicle comprises one or more of a camera sensor, a lidar sensor, a radar sensor, a GPS sensor, and an ultrasound sensor.

13. The system of claim 10, wherein the instructions further comprise determining a state of the autonomous vehicle within the simulated environment, wherein the state of the autonomous vehicle comprises one or more of a location or an orientation of the autonomous vehicle.

14. The system of claim 10, wherein the critic neural network rewards the actor neural network by providing an error signal calculated using an exploration-exploitation tradeoff model.

15. The system of claim 10, wherein the instructions further comprise storing one or more of a state of the autonomous vehicle, an action taken at the state of the autonomous vehicle, or a reward and a penalty corresponding to the action in a replay buffer.

16. The system of claim 10, wherein the instructions further comprise:
    calculating a new plurality of driving maneuvers for a plurality of autonomous vehicles from the initial location to the target destination, wherein the plurality of autonomous vehicles comprises the autonomous vehicle; and
    communicating information from a neural network corresponding to each of the plurality of autonomous vehicles to a central master actor.

17. Non-transitory computer readable storage medium storing instructions for execution by one or more processors, the instructions comprising:
    identifying a state of an autonomous vehicle within a simulated environment, wherein the simulated environment comprises a plurality of operating parameters for training a reinforcement learning framework to calculate driving maneuvers for the autonomous vehicle;
    calculating, with an actor neural network, a driving maneuver for navigating the autonomous vehicle from an initial location to a target destination;

determining, with a critic neural network, whether the driving maneuver was beneficial for accurately maneuvering the autonomous vehicle to the target destination;

in response to determining the driving maneuver was beneficial, causing the critic neural network to reward the actor during a training phase for the reinforcement learning framework; and in response to determining the driving maneuver was not beneficial, causing the critic neural network to penalize the actor neural network during the training phase for the reinforcement learning framework;

wherein the critic neural network rewards the actor neural network by providing an error signal calculated with an exploration-exploitation tradeoff model.

18. The non-transitory computer readable storage medium of claim 17, wherein the instructions further comprise:

calculating a new plurality of driving maneuvers for a plurality of autonomous vehicles from the initial location to the target destination, wherein the plurality of autonomous vehicles comprises the autonomous vehicle; and communicating information from a neural network corresponding to each of the plurality of autonomous vehicles to a central master actor.

* * * * *